United States Patent [19]

Brown

[11] 4,222,217
[45] Sep. 16, 1980

[54] AQUATIC WEED HARVESTING APPARATUS

[76] Inventor: Marshall B. Brown, P.O. Box 9515, Winter Haven, Fla. 33880

[21] Appl. No.: 892,503

[22] Filed: Apr. 3, 1978

[51] Int. Cl.² .......................................... A01D 44/00
[52] U.S. Cl. .............................................. 56/9; 56/8
[58] Field of Search ...................... 56/8, 9, 501, 12.8, 56/12.9, 13.1; 302/58, 15; 37/58, 57, 59

[56] References Cited

U.S. PATENT DOCUMENTS

| | | | |
|---|---|---|---|
| 1,120,206 | 12/1914 | Knapp | 56/9 |
| 2,322,865 | 6/1943 | McDermott | 56/8 |
| 2,722,461 | 11/1955 | Tholl | 302/58 |
| 2,907,162 | 10/1959 | Rebikoff | 56/9 |
| 3,253,357 | 5/1966 | Allard | 37/65 |
| 3,521,387 | 7/1970 | Degelman | 56/9 |
| 3,546,858 | 12/1970 | Chaplin | 56/9 |
| 3,626,675 | 12/1971 | Chaplin | 56/9 |
| 3,688,479 | 9/1972 | Martinson et al. | 56/13.2 |
| 3,866,396 | 2/1975 | Meyer | 56/9 |
| 3,884,018 | 5/1975 | Chaplin | 56/9 |
| 3,962,803 | 6/1976 | O'Brien | 37/66 |
| 4,070,978 | 1/1978 | Virgilio | 56/8 |

Primary Examiner—Paul J. Hirsch
Attorney, Agent, or Firm—Duckworth, Hobby, Allen & Pettis

[57] ABSTRACT

Apparatus for harvesting aquatic plants from a body of water includes transporting means, such as a trailer or a floating craft, adapted to move into the body of water. A centrifugal pump mounted on one end of the transported is adapted to be at least partially submerged in the body of water, the pump including a housing having an opening for transmitting water and aquatic plants therein into the housing. The centrifugal pump pumps water and the aquatic plants from the body of water. An envelope surrounds at least a portion of the opening in the housing and extends outward from the housing and the opening for restricting water flow into the opening.

22 Claims, 9 Drawing Figures

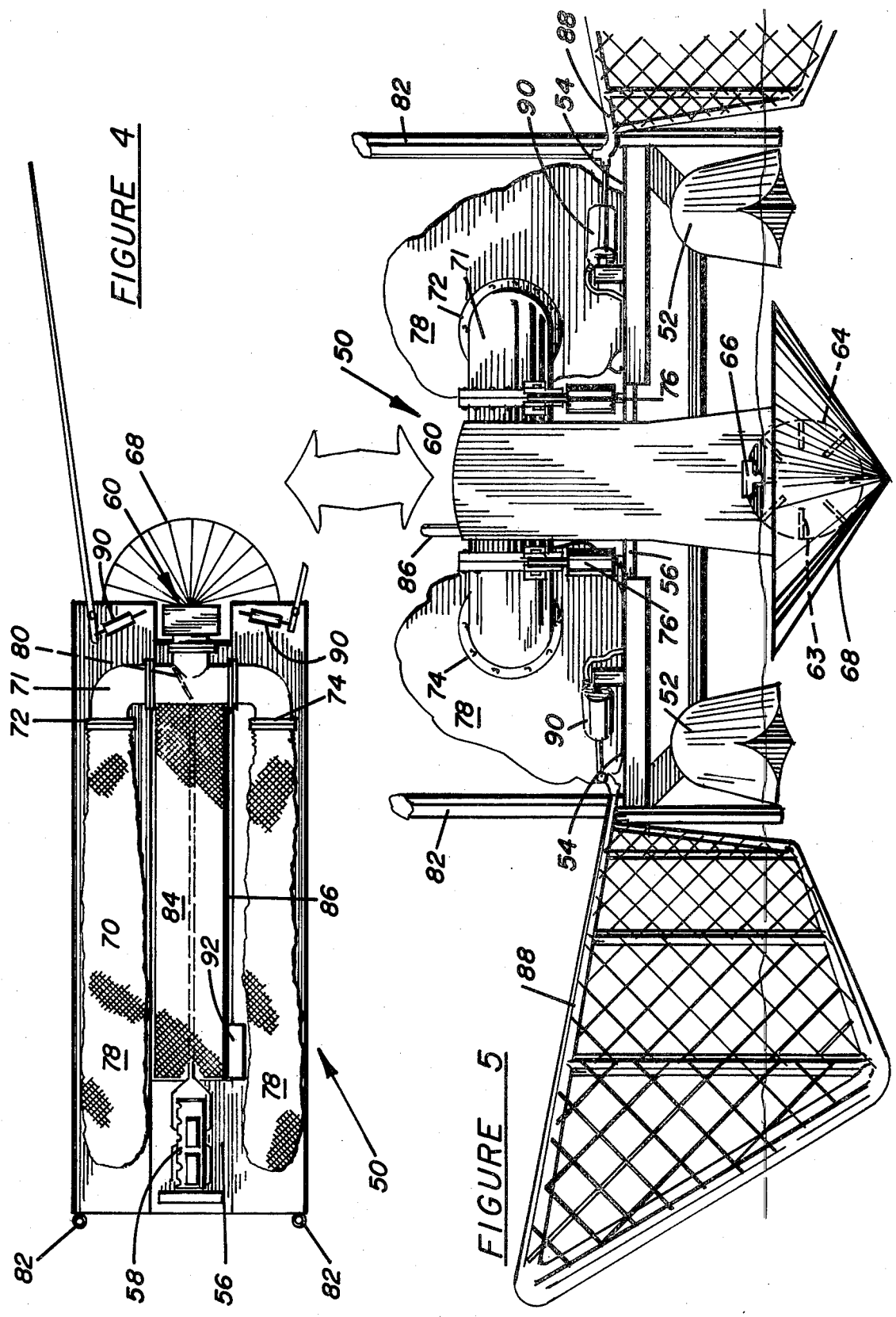

AQUATIC WEED HARVESTING APPARATUS

BACKGROUND OF THE INVENTION

1. Field of the Invention

The present invention relates to harvesting apparatus and methods, and in particular relates to apparatus designed to harvest aquatic weeds.

2. Description of the Prior Art

There are two types of fresh water aquatic weeds which presently cause considerable ecological and economic harm in certain areas of the United States, particularly in the warmer regions, such as Florida and other southeastern states.

One of these aquatic weeds is *Eichhornia Crassipes Mart. Solmes*, commonly referred to as "water hyacinths". These plants grow on the surface of the water with root structures extending only a few inches, on the order of five to twenty inches, below the surface; and grow in densities ranging between forty to one hundred fifty tons per acre, in fresh water bodies ranging from small canals and lakes to very large lakes and rivers.

The second of these aquatic weeds is *Hydrilla Verticillata Royale*, commonly referred to as "hydrilla". Hydrilla is a submerged, rooted plant which grows to a height where sufficient sunlight permits blooming. The density of hydrilla growth typically ranges from eight to twenty tons per acre.

Numerous systems and methods have been developed in the prior art for harvesting aquatic weeds. Examples of such arrangements are disclosed in the following United States patents: U.S. Pat. No. 3,866,396 to Meyer; U.S. Pat. No. 3,884,018 to Chaplin; U.S. Pat. No. 2,648,940 to Merkley, et al.; U.S. Pat. No. 3,130,531 to Woleslagle; U.S. Pat. No. 2,677,926 to Washbourne, et al.; U.S. Pat. No. 3,599,354 to Larson; U.S. Pat. No. 644,885 to Allen; U.S. Pat. No. 3,601,956 to Akermanis; and U.S. Pat. No. 3,971,148 to Deal.

Some prior art aquatic weed harvesting systems have been unable to harvest aquatic weeds in sufficient quantities to economically justify their operation. Systems which have sufficient harvesting rates have been characterized by rotating cutting heads, or suction heads which are submerged in proximal relation to the hydrilla, when being harvested. See for example, U.S. Pat. No. 3,971,148 and U.S. Pat. No. 3,866,396, referred to above. However, these systems disturb the loose silt or sand bottom customarily found in fresh water lakes and rivers. This, in turn, can result in long term damage to the ecological balance of the body of water. Because of the severity of this problem, some states have passed regulations which restrict the amount of soil disturbance that can take place during aquatic weed harvesting operations.

SUMMARY OF THE INVENTION

The present invention contemplates aquatic weed harvesting apparatus adapted to provide a relatively high rate of harvesting, and which is particularly adapted to minimize the level of hydrosoil disturbance during harvesting operations. To this end, the apparatus is provided with suction pumping means surrounded by an enclosing envelope to reduce the level of water turbulence as water and aquatic weeds contained therein are drawn through the envelope and into the pumping means.

In one embodiment of the apparatus according to the present invention, the pumping means comprises a centrifugal pump including a housing having an intake port associated therewith. An envelope in the form of a skimmer tray extends away from the housing and the intake port. The apparatus is mounted on either a mobile trailer, or on a floating craft such that the pump housing may be moved upward and downward to position the upper rim of the skimmer tray with only the first few inches below the surface of the water permitted to enter the intake port of the pump. This results in a high rate of intake of the water hyacinths which customarily float on the top of the water, while restricting the amount of water that is taken in with the aquatic weed being harvested.

For use in harvesting hydrilla, the preferred form of the envelope comprises an enclosing transition which completely surrounds the intake port to the pump (which is customarily round) and transcends to a thin slot into which the hydrilla are drawn. Cutting means may be provided adjacent the slot to cooperate therewith to sever the weeds, thereafter permitting the weeds to be drawn through the transition and into the pump.

Collection means on the floating craft, such as a baler, is also provided to collect the harvested weed and permit the water taken in with the weed to be drained from the craft. Alternatively, the harvested weeds may be pumped directly to a spoils area, or to a disposal vehicle, such as a barge or truck.

THE DRAWING

FIG. 4 is a top plan view of a second embodiment of the apparatus in accordance with the present invention.

FIG. 5 is a front view of the apparatus shown in FIG. 4.

DETAILED DESCRIPTION

Figure 1:
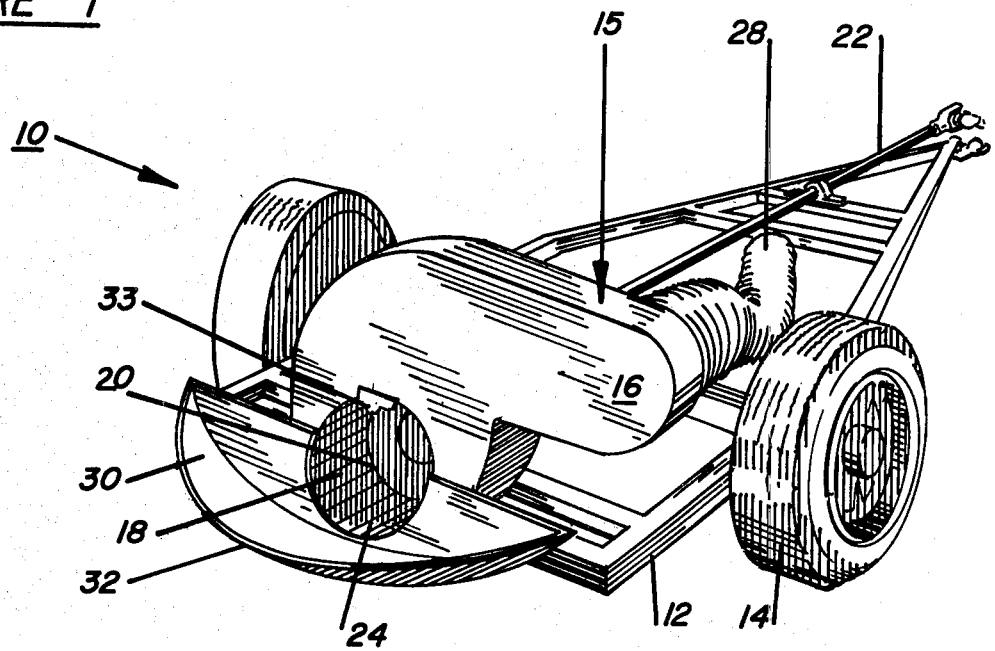
FIG. 1 is a perspective view of the first embodiment of the apparatus in accordance with the present invention.

The described apparatus generally includes a centrifugal pump adapted to receive water and constituent aquatic weeds, chop the weeds and pump the water and weeds to a point where the water may be drained and the weeds compacted and removed. The apparatus further includes an envelope which extends away from the intake port to the centrifugal pump and reduces water turbulence at that port, to prevent disturbance to the hydrosoil at the bottom of the body of water.

The basic apparatus, as described just above, may be modified for use in two different aquatic weed harvesting environments, i.e. for harvesting either hyacinths or hydrilla. Specific forms of the apparatus as useful in each environment are described next.

ENVIRONMENT I

In this first embodiment the apparatus is specifically adapted for harvesting floating vegetation, such as hyacinths or hydrilla which has previously been cut.

A. Trailer-mounted hyacinth harvester

A first form of the apparatus as specifically adapted for mounting on a trailer, will be described with reference to FIGS. 1, 2 and 3 of the enclosed drawing.

The trailer-mounted harvester, referred to generally as 10, includes a trailer bed 12 carried by wheels 14 in a conventional manner.

A centrifugal pump 15 is mounted in the rear of the trailer bed 12. Noting FIGS. 1 and 2, the pump 15 includes a housing 16 provided with a squirrel cage rotor 18 therein, including radial vanes 20 carried by a hub 34, which is driven by a shaft 22. The pump 15 further includes an intake port 24 and an outlet 26 which communicates with a pipe 28 through which the output from the pump is directed. As described thus far, the apparatus 10 comprises a conventional irrigation pump useful for lifting water from an irrigation canal or other body of water into crop fields or orchards. Typically, irrigation pumps of this type, having an intake port between about twelve to twenty inches wide, are capable of propelling five thousand to ten thousand gallons of water per minute.

Reference is again made to FIGS. 1 and 2. In order to specifically adapt the trailer-mounted apparatus 10 for use as a floating weed harvester, the apparatus is provided with a skimmer 30 formed of a curved envelope partially surrounding the intake port 24 and extending to an upper rim 32 which is substantially level with the upper edge of the intake port 24. A chopper blade 33 is mounted along the periphery of the intake port 24 to cooperate with the vanes 20 to chop the hyacinths entering the pump 15, as described in greater detail below. Plural struts 36 support a bearing 38 for the shaft 22, as it extends into the housing 16.

Figure 3:
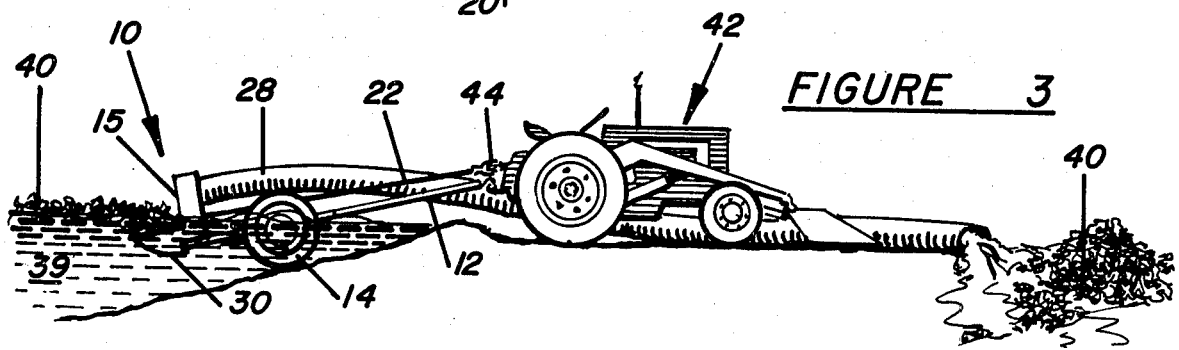
FIG. 3 is a side view illustrating the manner of use of the apparatus shown in FIGS. 1 and 2.

Reference is now made to FIG. 3. The trailer-mounted harvester 10 is coupled to a tractor 42 having a conventional power takeoff 44 permitting the tractor to be coupled to rotate the shaft 22. The trailer 10 is then backed into a body of water 39 choked with hyacinths 40. In use, the hyacinths 40 in close proximity to the skimmer 30 are drawn into the skimmer and thence into the intake port 24 where the hyacinths are chopped by rotation of the vanes 20 and by movement across the blade 33. During this operation, the skimmer 30 prevents undue turbulence underneath the intake port 24, thus preventing disturbance to the bottom 46 of the body of water. The chopped hyacinths 40 are then forced through the pipe 28 out of the water 39. After the hyacinths 40 are cleared from the area around the back of the trailer 10, the substantial water flow caused by the pumping action draws additional hyacinths into the skimmer 30 without having to move the trailer.

Experimental uses of the relatively simple trailer-mounted construction described above were carried out during the summer of 1977 along the St. Johns and Withlacoochee Rivers in Florida. During these tests, removal rates of hyacinths of between forty to fifty tons per hour were observed.

B. Pontoon-mounted hyacinth harvester

A second form of the apparatus as adapted to harvest hyacinths and other floating vegetation is shown and described with reference to FIGS. 4 and 5.

Figure 2:
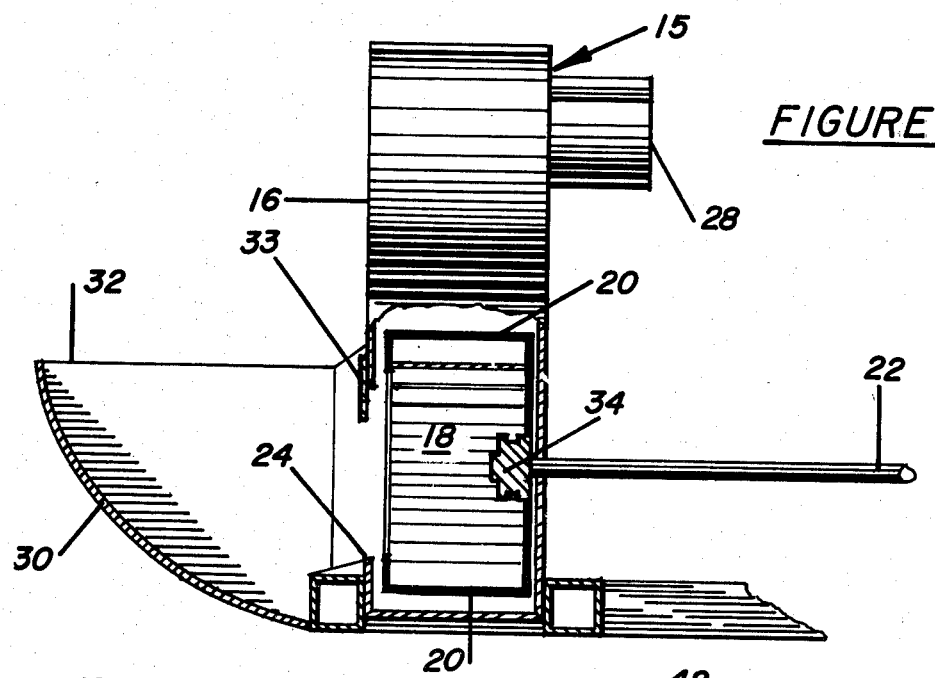
FIG. 2 is a cross section of a portion of the apparatus shown in FIG. 1, taken along the lines 2—2.

In this harvester, referred to generally as 50, a centrifugal pump-skimmer arrangement similar to that shown in FIGS. 1–3 is mounted on a pair of pontoons 52, each pontoon having an upper flat supporting surface 54. A platform 56 at the rear of the pontoons 52 supports a power plant 58, such as a conventional internal combustion engine.

The centrifugal pump 60 includes a housing 62 having an internal squirrel cage rotor-vane arrangement like that shown in FIGS. 1 and 2, including vanes 63, and an intake port 64 having a blade 66 mounted along the periphery thereof, again in a manner similar to that shown in FIGS. 1 and 2. A skimmer 68 essentially identical to the skimmer 30 of FIGS. 1–3 is mounted on the front of the housing 60 and extends away from the intake port 64, the upper rim of the skimmer 68 being substantially level with the upper edge of the intake port. The harvester 50 includes a drive shaft 70 coupled to rotate the squirrel cage rotor, including the vanes 63, in a manner as was previously described.

Noting both FIGS. 4 and 5, the harvester 50 includes a Y-shaped pipe 71 coupled to the housing 60 and including two outlets 72, 74. The harvester 50 is further provided with two mesh bags 78, each bag having an opening which is fitted over a respective one of the outlets 72, 74 of the output pipe 71. An internal valve 80, represented by a dotted line in FIG. 4, is included at the junction of the Y-shaped outlet pipe 71 to permit the operator to direct the flow of the output from the housing 60 into one or the other outlet 72, 74. The harvester 50 is further provided with anchor poles 82 which extend from the rear of the floating craft to rigidly support the craft as is needed.

Noting FIG. 5, two hydraulic cylinders 76 support the outlet pipe 71 on opposite sides of the housing 60. These hydraulic cylinders 76 may be operated in a conventional manner to move the entire combination of the outlet pipe 71 and the housing 60, as well as the skimmer 68 up and down as is needed to adjust the desired level of the skimmer tray 68.

The harvester 50 further includes a catwalk 84 which extends along the craft between the two pontoons 52 and over the drive shaft 70, and a hand rail 86, all of which is designed to permit an operator to move between the power plant 58 and the valve 80 to operate the harvester 50 as is further described below. The harvester 50 is further provided with a pair of boom arms 88 which are pivoted along respective sides of the harvester 50 to direct hyacinths toward the skimmer tray 68.

The harvester 50, as shown in FIGS. 4 and 5, is provided with a conventional outboard motor or a propeller takeoff from the power plant 58 and a steering mechanism to permit the craft to be steered through large concentrations of water hyacinths. The craft further includes an operator's control box 92 which is coupled in a conventional manner to control operation of the hydraulic cylinders 76 and 90.

During use, the operator steers the craft through large concentrations of hyacinths, which are directed into the skimmer 68 by the boom arms 88. The operator controls the hydraulic cylinder 76 to raise or lower the housing 60 and the outlet pipe 71 such that the upper edge of the intake port 64 is approximately five to ten inches below the surface of the water. As the craft proceeds through the hyacinths on the surface, water and the hyacinths are drawn into the skimmer 68 and into the intake port 64 of the centrifugal pump within the housing 60. The hyacinths are then chopped by action of the vanes 63 and the blade 66, and pumped into one of the mesh collection bags 78, dependent upon the position of the valve 80 as controlled by the operator. The operator continually monitors the balance of the weight distribution between the bag 78 and controls the position of the valve 80 to maintain an equal weight distribution. Water sucked through the pump housing 60 continually drains from the bags 78, thus permitting the chopped hyacinths in the bag 78 to be reduced significantly in weight and compacted by the pump pressure at the respective outlet 72, 74. When each bag 78 is filled, it may be tied off at the open end and transferred to a barge, or pushed into the water and floated to a terminal where the bag and its contents can be removed and thereafter emptied at a land fill or fertilization site. This bagging collection technique is particularly useful where harvesting is taking place near a populated area where complete removal of the hyacinths is desirable. However, in remote wilderness areas, the hyacinths may be simply pumped onto a spoils island or lake bank by using tubing like the pipe 28 in FIGS. 1-3.

Figure 6:
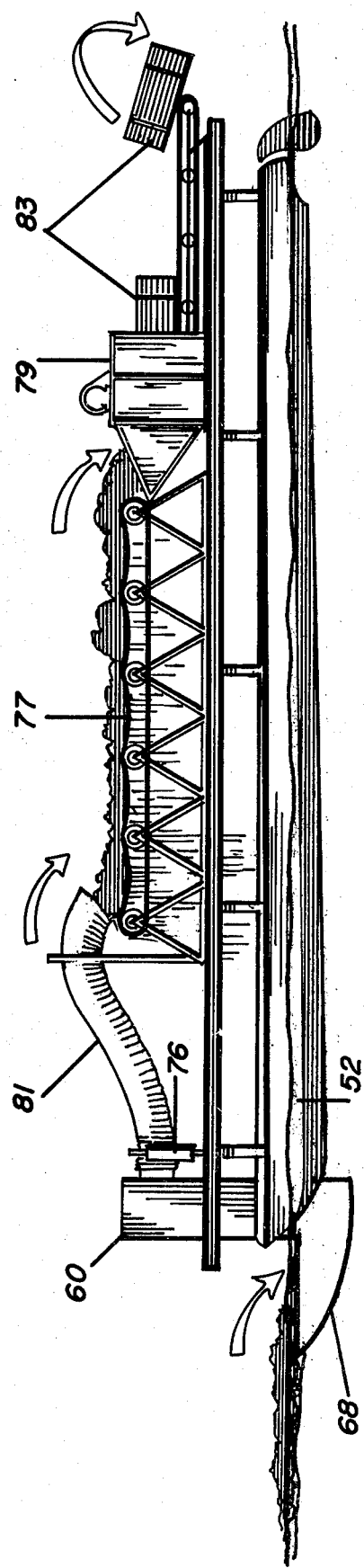
FIG. 6 is a side view of an alternate form of the apparatus of FIGS. 4 and 5.

As an alternate to the onboard bag collection arrangement shown in FIGS. 4 and 5, a baler may be supported by the floating craft. An example of such an arrangement is shown in FIG. 6, where like reference numbers refer to the same elements as in FIGS. 4 and 5. A drying conveyor 77 replaces the catwalk, and a conventional baler 79 is mounted rearwardly of the craft between the pontoons 52. An output pipe 81 dumps the hyacinth output onto the conveyor 77, which then conveys the harvested growth into the baler 79. The baled output 83 may then be pushed overboard and floated to a disposal site.

ENVIRONMENT II

In the second environment, the apparatus is specifically adapted for harvesting submerged, rooted vegetation such as hydrilla.

This version of the harvesting apparatus is described with reference to FIGS. 7, 8 and 9 of the drawings.

The harvester, referred to generally as 100, comprises a floating craft having a pair of pontoons 52 each supporting a platform 54, in a manner similar to the arrangement shown in FIGS. 4 and 5. The harvester 100 further includes a Y-shaped outlet pipe 71 having two outlets 72, 74 to which is coupled a respective collection bag 78. The pipe 71 is supported by hydraulic cylinder 76 to permit the entire pump head to be controlled to move up and down.

Figure 7:
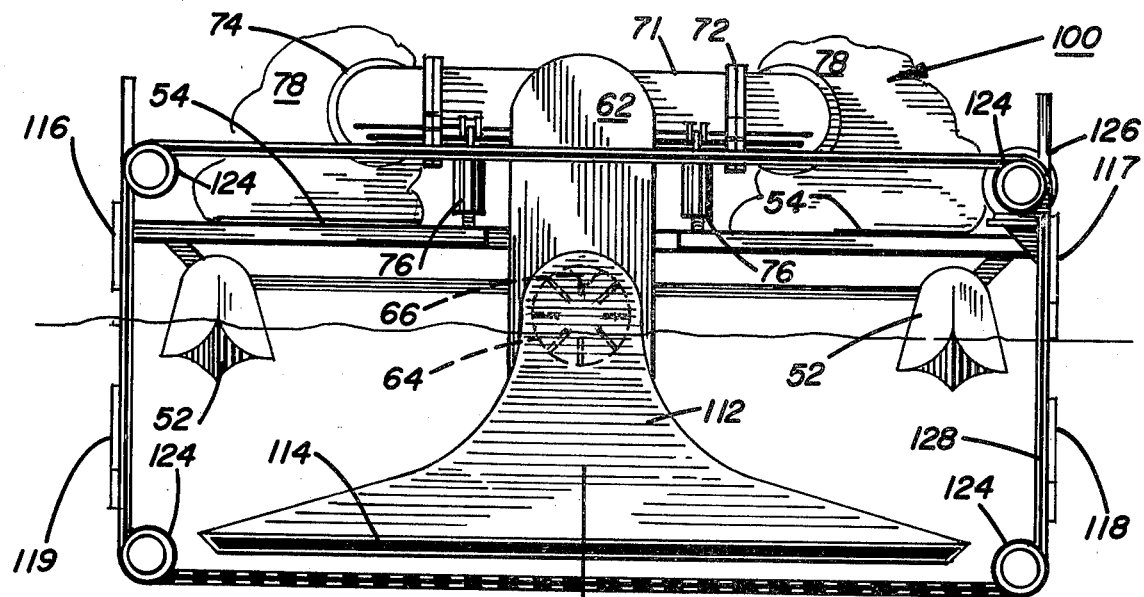
FIG. 7 is a front view of a third embodiment of apparatus in accordance with the present invention.
Figure 8:
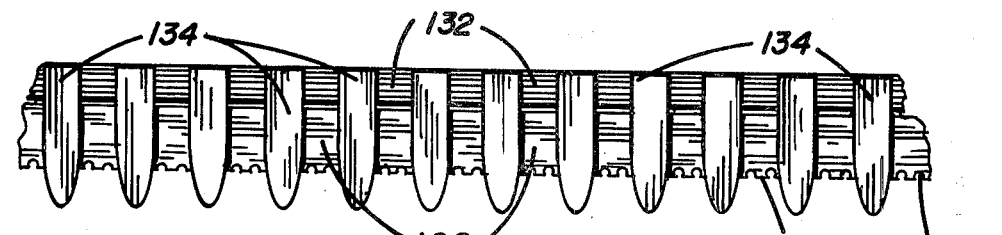
FIG. 8 is a top plan view of a portion of the apparatus shown in FIG. 7.
Figure 9:
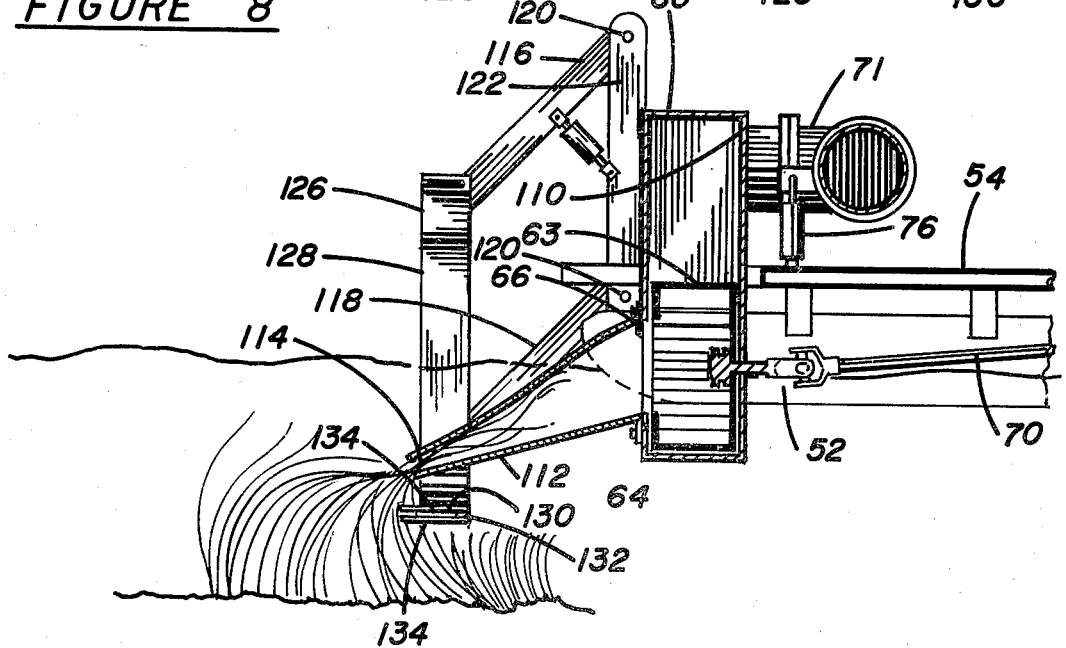
FIG. 9 is a side view, partially in cross section, of a portion of the apparatus shown in FIG. 7.

The housing 60 of FIGS. 7 and 9 is the same housing as FIGS. 4 and 5, and includes a squirrel cage rotor having vanes 63, the rotor driven by the shaft 70 coupled to the power plant 58 (FIG. 4). The housing 60 includes an intake port 64 having a chopper blade 66 positioned along the periphery thereof.

The features of the harvester 100 described thus far are essentially identical to those of the harvester 50 of FIGS. 4 and 5, and it is intended that the craft may have interchangeable parts so as to permit common usage of most of the associated apparatus in either harvesting environment. To this end, the skimmer tray 68 (FIG. 5) is bolted to the housing 60 to permit easy removal.

To permit the harvester 100 to operate in a hydrilla harvesting environment, the harvester is provided with a transition 112 comprising an envelope designed to surround the intake port 64 and transcend in a direction down and away from the intake port, to a thin, outward facing slot 114. The transition 112 is designed to be bolted onto the housing 60 in place of the skimmer tray 68.

In use, the harvester 100 is moved to a location where hydrilla are in abundance, and the housing 60 is lowered to a submerged position with the slot 114 preferably 36-60 inches below the surface. Rotation of the shaft 70 causes water and the hydrilla to be sucked into the slot 114, up the transition 112 and into the intake port 64, and thence to the collection bag 78. (Note FIGS. 7 and 9).

Suction removal of the hydrilla as described above is feasible where the hydrilla is not unusually dense or comprises relatively new growth. However, where the hydrilla are relatively thick or consist of strong, mature plants, severing of the plants may be required before they can be drawn into the pump housing 60.

To this end, the harvester 100 is provided with a cutting mechanism having a moving cutting blade operating below the slot 114 to sever the hydrilla after being drawn into the transition 112. The cutting mechanism includes four boom arms, 116, 117, 118 and 119, each rotatably mounted by a U-joint 120 at one end thereof to a frame 122, which in turn, is supported by the pontoons 52.

The other end of each boom arm 116, 118 and 119 includes a pulley 124 thereon, the other arm 117 having a hydraulic motor 126 rotating a pulley 124 associated therewith. An endless cutting blade 128 is carried by the pulleys 124 and rotated by the motor 126. Noting FIGS. 6 and 8, a rigid blade support member 130 extends between the boom arms adjacent and underneath the slot 114. As shown in FIGS. 7 and 8, the member 130 includes a spacer 132 and spaced, parallel rows of teeth 135 extending toward the directon of travel. The blade 128 moves between the rows of teeth 134, and has serrations 136 along the sharpened edge 129. In use, movement of the blade 128 across and underneath the lengthwise dimension of the slot 114 severs the hydrilla, which are held in the slot 114 by suction, and between adjacent teeth 134.

While specific forms of the harvesters have been described above, it will be understood that modifications can be made in these arrangements without interfering with the harvesting function. By way of example, the pump may be driven by a hydraulic motor, instead of the motor-shaft arrangement shown.

I claim:

1. Apparatus for harvesting aquatic plants from a body of water comprising:

transporting means adapted to move into said body of water;

a centrifugal pump including a housing mounted on one end of said transporting means and adapted to be at least partially submerged in said body of water, said housing having an opening for transmitting water and aquatic plants therein into said housing, said pump comprising means for pumping water and aquatic plants from said body of water and through said opening; and a skimmer tray surrounding the lower, submerged portion of said opening and extending upward and outward from said housing to an outer rim, said skimmer tray forming an envelope for restricting water flow into said opening, such that said pump may be employed to move water and aquatic weeds at the upper layer of said water to prevent disturbance to the bottom of said body of water.

2. The apparatus recited in claim 1 further comprising cutting means cooperating with said centrifugal pump for cutting aquatic plants therein.

3. The apparatus recited in claim 2 wherein said cutting means includes a chopper blade mounted on said housing, said chopper blade and said centrifugal pump cooperating to cut said aquatic plants in said housing.

4. The apparatus recited in claim 3 wherein said chopper blade is mounted along the periphery of said opening.

5. The apparatus recited in claim 2 further comprising driving means including a drive shaft extending along said transporting means for rotating said centrifugal pump.

6. The apparatus recited in claim 5 wherein said transporting means comprises a land vehicle having wheels thereon, said pump mounted at one extremity of said vehicle for at least partial submersion in said body of water.

7. The apparatus recited in claim 5 wherein said transporting means comprises a floating craft with said housing mounted on one end thereof.

8. The apparatus recited in claim 7 wherein said driving means includes a motor on an end of said craft opposite said one end, with said drive shaft coupled between said motor and said pump.

9. The apparatus recited in claim 7 wherein said floating craft comprises a pair of parallel pontoons, and wherein said housing is mounted between said two pontoons.

10. The apparatus recited in claim 7 further comprising means for reciprocally moving said housing up and down with respect to said one end.

11. The apparatus recited in claim 7 further comprising means for receiving an output from said pump through said housing and separating said aquatic weeds from said water, to permit said water to drain from said craft.

12. The apparatus recited in claim 11 wherein said receiving means includes at least one mesh collection bag coupled to said output from said pump.

13. The apparatus recited in claim 11 further comprising;
a Y-branched conduit coupled to said output so as to provide two outlets coupled to said output of said housing; and
means in said conduit for switching said output between said outlets.

14. The apparatus recited in claim 7 further comprising at least one boom arm extending away from said one end of said floating craft, to permit guiding of said aquatic weeds into said envelope.

15. The apparatus recited in claim 7 wherein said opening is substantially round, and said envelope comprises a transition surrounding said opening and extending to a slot, the horizontal length of which is substantially greater than the vertical height.

16. The apparatus recited in claim 15 wherein said transition extends substantially below said housing and said floating craft.

17. The apparatus recited in claim 16 wherein said transition comprises a hollow shell curving downward and away from said housing, with said slot extending across the extremity of said shell.

18. The apparatus recited in claim 15 further comprising;
movable cutting means; and
means for positioning said cutting means next to said slot to cut aquatic weeds adjacent thereto.

19. The apparatus recited in claim 18 wherein said cutting means comprises:
an endless cutting blade;
means for supporting said blade underneath said slot; and
means for rotating said blade.

20. Apparatus for harvesting aquatic weeds from a body of water comprising:
a support adapted to extend into a body of water;
pumping means mounted on said support;
means between said body of water and said pumping means for transmitting water from said body and aquatic weeds therein through said pump responsive to energization of said pump; and
means restricting the level of water in said body of water in communication with said pump to the upper layer thereof to prevent disturbance to the bottom of said body of water, said means for restricting the level of the water comprising a skimmer tray surrounding a lower, submerged portion of said pump and extending upward and outward from said pump to an outer rim, the skimmer tray forming an envelope for restricting water flow into said pump such that said pump may be employed to move water and aquatic weeds at the upper layer of the water to prevent disturbance to the bottom of the body of water.

21. The apparatus recited in claim 20 further comprising means for varying the height of said restricting means.

22. The apparatus recited in claim 20 wherein said pump comprises a housing mounted on said support, and wherein said transmitting means comprises an input opening extending through said housing.

* * * * *